United States Patent
Huggins et al.

(10) Patent No.: US 11,678,735 B2
(45) Date of Patent: *Jun. 20, 2023

(54) PORTABLE LOAD DISTRIBUTING CARRYING APPARATUS

(71) Applicant: Pelican Pole LLC, Mableton, GA (US)

(72) Inventors: Mark Huggins, Hilton Head Island, SC (US); Nicholas Campion Godfrey, Charleston, SC (US); Aaron Hunter Pierce, Oviedo, FL (US); Benjamin John Thomas, Anderson, SC (US); Sean F. Carbonell, Mableton, GA (US)

(73) Assignee: Pelican Pole LLC, Mableton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,300

(22) Filed: Dec. 10, 2021

(65) Prior Publication Data

US 2023/0048003 A1 Feb. 16, 2023

Related U.S. Application Data

(63) Continuation-in-part of application No. 17/403,797, filed on Aug. 16, 2021.

(51) Int. Cl.
*A45F 3/10* (2006.01)
*B65G 7/12* (2006.01)

(52) U.S. Cl.
CPC .................. *A45F 3/10* (2013.01); *B65G 7/12* (2013.01)

(58) Field of Classification Search
CPC ............ B65G 7/12; A45F 3/10; A45F 5/1026; A47G 25/40; A47G 25/403;

(Continued)

(56) References Cited

U.S. PATENT DOCUMENTS 966,562 A * 8/1910 Knoerzer ............... A45F 3/15
224/266
1,246,587 A * 11/1917 Giardino ............... A45F 5/1026
294/169

(Continued)

FOREIGN PATENT DOCUMENTS

CN 201341566 Y 11/2009
CN 107985895 A * 5/2018

(Continued)

OTHER PUBLICATIONS

International search report, International application No. PCT/US22/40445, dated Jan. 4, 2023. ISA/US, Alexandria, VA.

(Continued)

*Primary Examiner* — Justin M Larson
(74) *Attorney, Agent, or Firm* — Gregory Finch; Finch Paolino, LLC

(57) ABSTRACT

A portable carrying apparatus comprises a plurality of segments that mateably couple together to form an elongated carrying apparatus. Each of the plurality of segments may be selectively de-coupled from each other to enable a user to break down the apparatus and stack each segment for storage when not in use. In accordance with certain aspects of the present disclosure, the apparatus may have a first end (e.g., a proximal end) and a second end (e.g., a distal end) that are configured to receive/carry one or more cargo loads (e.g., a connected hook, strap, bag handle and the like). A user of the apparatus may selectively attach one or more cargo loads to the first end and/or second end of the apparatus and balance the apparatus on one or both of the user's shoulders to carry/transport the one or more cargo loads more easily to and from a desired destination.

20 Claims, 15 Drawing Sheets

(58) Field of Classification Search
CPC ............ A47G 25/4046; A47G 25/4053; A47G 25/1457; A47G 25/145
USPC ....... 224/266, 677; 294/87.2, 159, 170, 167, 294/169, 162; 223/89, 94
See application file for complete search history.

(56) References Cited

U.S. PATENT DOCUMENTS

| | | | | |
|---|---|---|---|---|
| 1,282,480 | A * | 10/1918 | Sommer | A47G 25/4061 223/90 |
| 1,545,765 | A * | 7/1925 | Harold | A47G 25/4061 223/94 |
| 1,743,234 | A * | 1/1930 | Porter | A47G 25/32 24/601.6 |
| 2,379,577 | A * | 7/1945 | Harsted | H01Q 1/088 343/900 |
| 2,986,314 | A * | 5/1961 | Miller | A45F 3/14 224/266 |
| 3,730,544 | A * | 5/1973 | Hyman | A63C 11/22 135/65 |
| 3,848,787 | A * | 11/1974 | Hill | A47G 25/1457 294/146 |
| 4,730,863 | A * | 3/1988 | Guadnola | A45F 5/102 294/142 |
| D309,834 | S * | 8/1990 | Passini | D6/318 |
| 5,018,627 | A * | 5/1991 | Moore | A47G 25/0692 206/291 |
| 5,361,956 | A * | 11/1994 | Recanati | A45F 5/00 294/169 |
| 5,421,059 | A * | 6/1995 | Letters, Jr. | A47H 15/04 362/253 |
| 5,667,266 | A * | 9/1997 | Giocanti | A45F 5/1026 294/170 |
| 5,680,972 | A * | 10/1997 | Clarke | A47G 25/16 223/89 |
| 5,901,888 | A * | 5/1999 | Schneider | A47G 25/403 223/89 |
| D464,691 | S * | 10/2002 | Tracy | D21/679 |
| 6,499,781 | B1 * | 12/2002 | Flynn | A45F 5/1026 294/170 |
| 6,557,572 | B2 * | 5/2003 | Lah | E04H 15/48 403/368 |
| 6,758,378 | B2 * | 7/2004 | Carmichael | A47G 25/16 223/94 |
| D503,023 | S * | 3/2005 | Holub | D34/28 |
| 6,880,794 | B1 * | 4/2005 | Kahn | E06C 7/143 248/315 |
| 7,077,300 | B1 * | 7/2006 | Di Pietro | A47G 25/442 223/89 |
| 7,681,766 | B2 * | 3/2010 | Harrison, III | A45F 3/10 224/907 |
| 7,909,186 | B1 * | 3/2011 | Contreras | A47G 25/0664 211/124 |
| 8,840,162 | B1 * | 9/2014 | Williams | B65H 75/366 294/143 |
| D728,039 | S * | 4/2015 | Groshek | D21/679 |
| 9,539,949 | B2 * | 1/2017 | Nuako | B60R 7/043 |
| 9,609,970 | B2 * | 4/2017 | Piraino | A47G 25/08 |
| 10,278,483 | B2 * | 5/2019 | Moore | A45F 3/02 |
| 10,413,791 | B2 * | 9/2019 | Moore | F16B 7/1481 |
| 10,702,050 | B1 * | 7/2020 | Hames | A45F 5/1026 |
| 10,874,896 | B1 * | 12/2020 | Little | A63B 21/0442 |
| 11,000,109 | B2 * | 5/2021 | Ullmann | A45F 3/14 |
| D935,185 | S * | 11/2021 | Ullmann | D3/327 |
| 11,499,334 | B2 * | 11/2022 | Baik | E04H 15/50 |
| 2007/0039983 | A1 * | 2/2007 | Harrison, III | A45F 5/00 224/265 |
| 2007/0125819 | A1 * | 6/2007 | Kahn | B25H 3/006 224/904 |
| 2007/0194064 | A1 * | 8/2007 | Elder | A47G 25/1407 223/89 |
| 2018/0255913 | A1 * | 9/2018 | Moore | A45F 5/1026 |
| 2019/0150646 | A1 * | 5/2019 | Maharajah | A47G 25/32 |
| 2020/0015614 | A1 * | 1/2020 | Choat | A47G 25/4061 |
| 2021/0357999 | A1 * | 11/2021 | Caraway | A47G 25/0635 |
| 2022/0170287 | A1 * | 6/2022 | Alma | E04H 15/60 |

FOREIGN PATENT DOCUMENTS

| | | | | |
|---|---|---|---|---|
| CN | 108069183 | A | * | 5/2018 |
| CN | 108249093 | A | * | 7/2018 ............... B65G 7/12 |
| CN | 109649921 | A | * | 4/2019 |
| CN | 110367786 | A | * | 10/2019 |
| CN | 110641899 | A | * | 1/2020 |
| CN | 210539611 | U | | 5/2020 |
| DE | 102017118408 | A1 | * | 2/2019 |
| GB | 2560821 | A | * | 9/2018 ............... A45F 3/02 |
| KR | 20220105481 | A | * | 7/2022 |
| WO | WO-9962383 | A3 | * | 4/2000 ......... A47G 25/1457 |

OTHER PUBLICATIONS

Written Opinion of the International Searching Authority, International application No. PCT/US22/40445, dated Jan. 4, 2023. ISA/US, Alexandria, VA.

\* cited by examiner

PORTABLE LOAD DISTRIBUTING CARRYING APPARATUS

CROSS-REFERENCE TO RELATED APPLICATIONS

This application is a continuation-in-part of U.S. application Ser. No. 17/403,797, entitled "PORTABLE LOAD DISTRIBUTING CARRYING APPARATUS" and filed Aug. 16, 2021, the disclosure of which is hereby incorporated in its entirety herein at least by virtue of this reference.

FIELD

The present disclosure relates to the field of outdoor tools and accessories; in particular, a portable load distributing carrying apparatus that may be balanced on the shoulders of a user.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is a portable carrying apparatus, comprising an elongated body comprising a first load bearing portion disposed on a proximal area of the elongated body, a second load bearing portion disposed on a distal area of the elongated body opposite the first load bearing portion, and a balancing portion comprising a central area of the elongated body, wherein the first load bearing portion and the second load bearing portion each comprises a plurality of concavities disposed on an upper surface of the elongated body, wherein the first load bearing portion comprises a first elongated aperture extending through the first load bearing portion, and the second load bearing portion comprises a second elongated aperture extending through the second load bearing portion.

In accordance with certain embodiments, the portable carrying apparatus may further comprise at least one attachment connector selectively interfaced with one or more concavity in the plurality of concavities. In certain embodiments, the at least one attachment connector may comprise a cylindrical body configured to selectively interface with the one or more concavity. In certain embodiments, the portable carrying apparatus may further comprise a strap portion extending laterally from the cylindrical body. The strap portion may be configured to extend through the first elongated aperture or the second elongated aperture when the at least one attachment connector is selectively interfaced with the one or more concavity. In certain embodiments, the balancing portion of the elongated body may comprise a concave lower surface.

Another object of the present disclosure is a portable carrying apparatus, comprising a first arm comprising a first frame, the first frame comprising a first connector portion and a first plurality of attachment protrusions; a second arm comprising a second frame, the second frame comprising a second connector portion and a second plurality of attachment protrusions; and a body portion comprising a first attachment interface and a second attachment interface, wherein the first connector portion of the first arm is mateably coupled with the first attachment interface of the body portion and the second connector portion of the second arm is mateably coupled with the second attachment interface of the body portion.

In accordance with certain embodiments, the first plurality of attachment protrusions are disposed on a lateral portion of the first frame and the second plurality of attachment protrusions are disposed on a lateral portion of the first frame. In certain embodiments, the first frame comprises a handle portion at a distal end of the first frame and the second frame comprises a handle portion at a distal end of the second frame. In certain embodiments, an upper portion of the body portion may comprise a handle.

Yet another object of the present disclosure is a portable carrying apparatus, comprising a first arm comprising a first load bearing portion; a second arm comprising a second load bearing portion; and an elongated body portion, wherein the first arm is rotatably coupled to the elongated body portion at a first end of the elongated body portion and the second arm is rotatably coupled to the elongated body portion at a second end of the elongated body portion, wherein the first arm and the second arm are selectively configured to rotate from a first position comprising a collapsed configuration to a second position comprising an extended configuration.

In accordance with certain embodiments, the elongated body portion may comprise an elongated aperture disposed on a central area of the elongated body portion. The first arm and the second arm may be positioned within the elongated aperture when selectively configured in the collapsed configuration. In certain embodiments, the first load bearing portion comprises a plurality of concavities disposed on an upper surface of the first arm and the second load bearing portion comprises a plurality of concavities disposed on an upper surface of the second arm. In certain embodiments, the first load bearing portion comprises an elongated aperture extending through the first load bearing portion adjacent to the plurality of concavities and the second load bearing portion comprises an elongated aperture extending through the second load bearing portion adjacent to the plurality of concavities.

Further aspects of the present disclosure provide for a portable carrying apparatus comprising a first carrying segment comprising at least one first member configured to receive a first cargo load and a first connector aperture disposed on an end of the first carrying segment; a middle segment comprising a first connector protrusion extending from a first end of the middle segment and a second connector aperture disposed on a second end of the middle segment; and a second carrying segment comprising at least one second member configured to receive a second cargo load and a second connector protrusion extending from an end of the second carrying segment, wherein the first connector protrusion extending from the first end of the middle segment is mateably interfaced with the first connector aperture disposed on the end of the first carrying segment, and wherein the second connector protrusion extending from the end of the second carrying segment is mateably interfaced with the second connector aperture disposed on the second end of the middle segment.

Still further aspects of the present disclosure provide for a portable carrying apparatus comprising a first carrying segment comprising at least one first member configured to receive a first cargo load; a first arm segment mateably interfaced with the first carrying segment at a first end of the first arm segment; a middle segment mateably interfaced with a second end of the first arm segment at a first end of the middle segment; a second arm segment mateably interfaced with a second end of the middle segment at a first end of the second arm segment; and a second carrying segment comprising at least one second member configured to receive a second cargo load, wherein the second carrying segment is mateably interfaced with a second end of the second arm segment at a first end of the second carrying segment.

Still further aspects of the present disclosure provide for a portable carrying apparatus comprising a first carrying segment comprising at least one first member configured to receive a first cargo load; a first arm segment mateably interfaced with the first carrying segment at a first end of the first arm segment; a middle segment mateably interfaced with a second end of the first arm segment at a first end of the middle segment; a second arm segment mateably interfaced with a second end of the middle segment at a first end of the second arm segment; a second carrying segment comprising at least one second member configured to receive a second cargo load, wherein the second carrying segment is mateably interfaced with a second end of the second arm segment at a first end of the second carrying segment; and a stretchable cord extending through an interior portion of the first carrying segment, the first arm segment, the middle segment, the second arm segment, and the second carrying segment.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
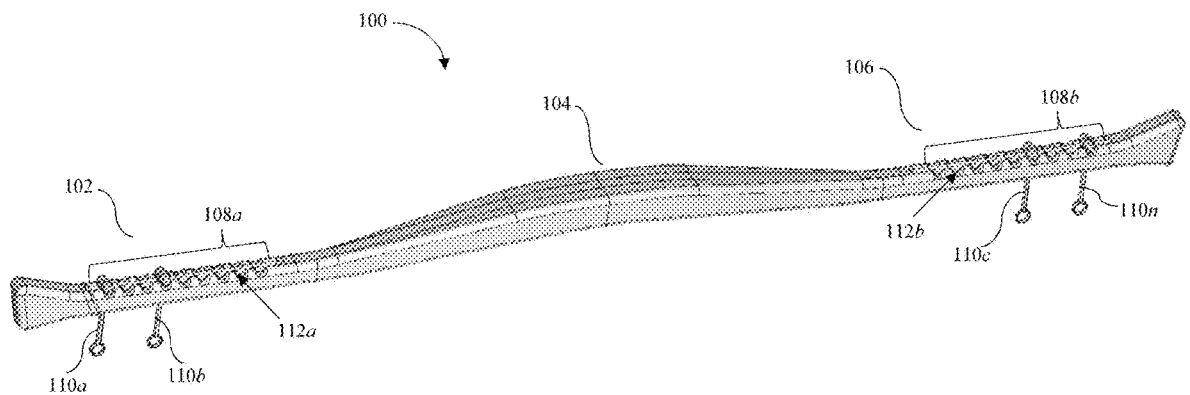
FIG. 1 is a perspective view of a portable carrying apparatus, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for a portable carrying apparatus configured to selectively attach a cargo load to one or more attachment points and enable a user to balance and carry the attached cargo load on one or both of the user's shoulders.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

Turning now descriptively to the drawings, in which similar reference characters denote similar elements throughout the several views, FIG. 1 depicts a portable carrying apparatus 100. In accordance with certain aspects of the present disclosure, portable carrying apparatus 100 may be configured as an elongated, unitary body comprising a first load bearing portion 102, a body portion 104 and a second load bearing portion 106. First load bearing portion 102 may extend laterally from a first side of body portion 104 and second load bearing portion 106 may extend laterally from a second side of body portion 104, such that first load bearing portion 102 extends in an opposite direction from second load bearing portion 106. Body portion 104 may be thicker in width than first load bearing portion 102 and second load bearing portion 106 in order to increase the tensile strength of portable carrying apparatus 100 and help distribute the weight of a cargo load attached to portable carrying apparatus 100 when carried by a user. Body portion 104 may be curved at a lower surface to improve comfort to a user when portable carrying apparatus 100 is balanced on one or both shoulders of a user when in use. In accordance with certain embodiments, portable carrying apparatus 100 may further comprise a first plurality of concavities 108a disposed on an upper surface of first load bearing portion 102 and a second plurality of concavities 108b disposed on an upper surface of second load bearing portion 106. In accordance with certain embodiments, the plurality of concavities 108a,b is configured as semi-circular or notched portions disposed on the upper surface of portable carrying apparatus 100. In accordance with certain embodiments, plurality of concavities 108a,b may comprise receiving portions configured to receive a peg, connector or other attachment mechanism. The plurality of concavities 108a,b may be configured to mateably interface with an upper portion of an attachment connector 110a,b,c . . . n. In accordance with certain embodiments, portable carrying apparatus 100 may further comprise a first channel 112a extending through portable carrying apparatus 100 at first load bearing portion 102 and a second channel 112b extending through portable carrying apparatus 100 at second load bearing portion 106.

Figure 2:
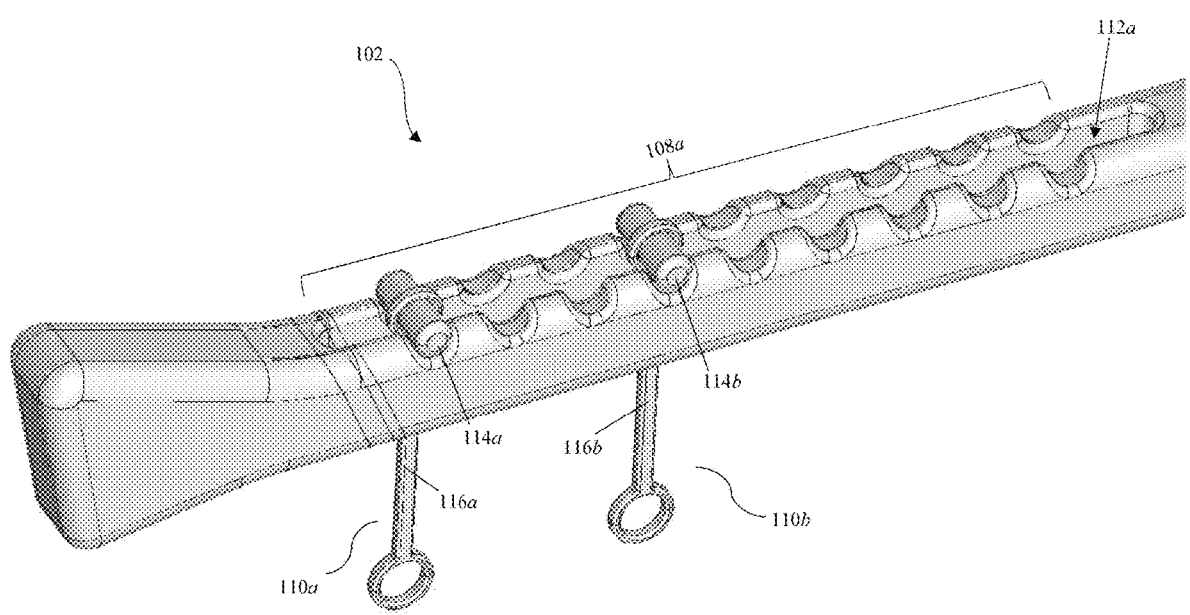
FIG. 2 is an enlarged view of a load bearing portion of the portable carrying apparatus, in accordance with certain aspects of the present disclosure.
Figure 3:
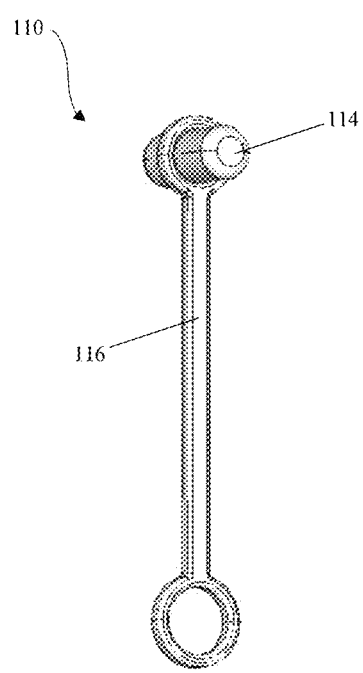
FIG. 3 is an enlarged view of an attachment connector of the portable carrying apparatus, in accordance with certain aspects of the present disclosure.

Referring now to FIGS. 2 and 3, an enlarged view of first load bearing portion 102 and an attachment connector 110 of portable carrying apparatus 100 is shown. As shown in FIG. 3, an attachment connector of portable carrying apparatus 100 may comprise a strap portion 116 and a peg portion 114. Strap portion 116 may comprise an elongated strap with an upper aperture and a lower aperture. The upper aperture of strap portion 116 may be configured to be securely coupled to a circumference of peg portion 114. The lower aperture of strap portion 116 may be configured to receive a hook, carabiner, rope, and/or other attachment means configured to selectively couple a cargo load to portable carrying apparatus 100. In certain embodiments, peg portion 114 may be configured as a three-dimensional shape (such as a cylinder, triangular prism, etc.) configured to mateably interfaced with the receiving portion of the plurality of concavities 108a,b. In accordance with certain embodiments, attachment connectors 110a,b may be selectively interfaced with first load bearing portion 102 as shown in FIG. 2. Strap portion 116a,b may extend through first channel 112a until peg portion 114a,b interfaces with the desired concavity in the plurality of concavities 110a,b.

Figure 4:
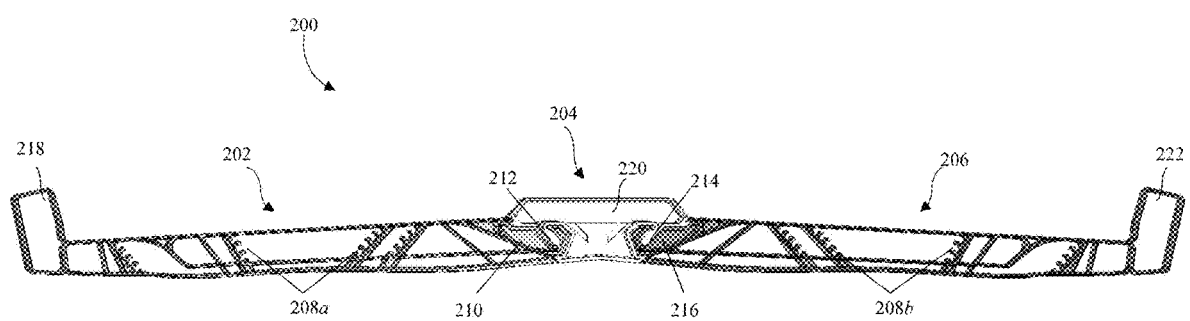
FIG. 4 is a perspective view of a portable carrying apparatus, in accordance with certain aspects of the present disclosure.
Figure 5:
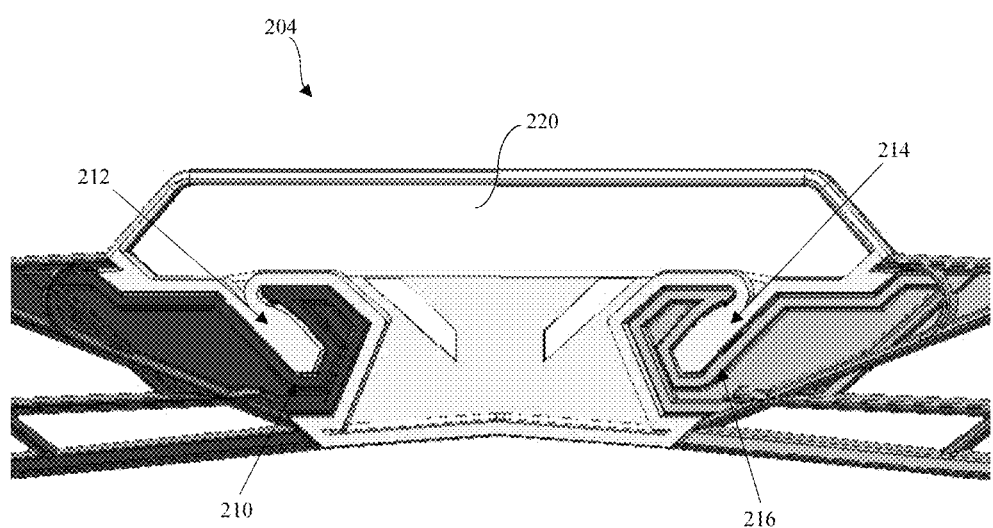
FIG. 5 is an enlarged view of a body portion of the portable carrying apparatus, in accordance with certain aspects of the present disclosure.
Figure 6:
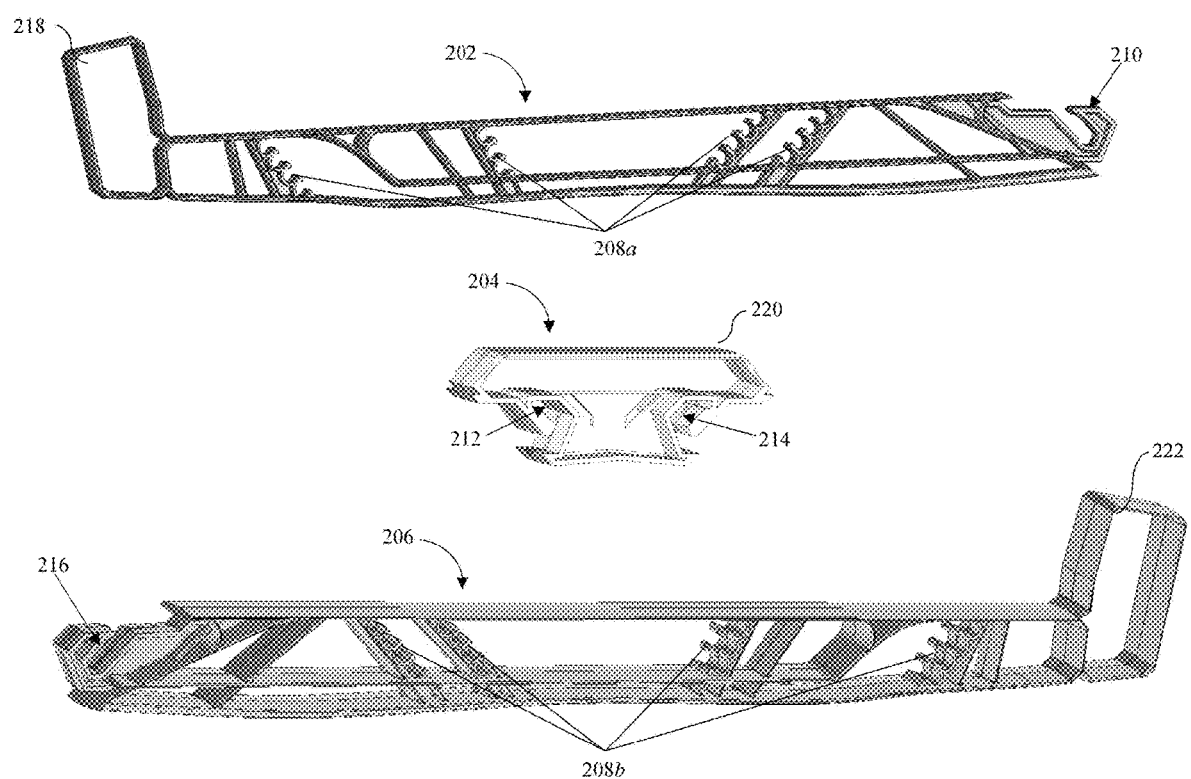
FIG. 6 is a component view of the portable carrying apparatus, in accordance with certain aspects of the present disclosure.

Referring now to FIG. 4, a perspective view of a portable carrying apparatus 200 is shown. In accordance with certain aspects of the present disclosure, portable carrying apparatus 200 comprises an alternative embodiment of the present invention to portable carrying apparatus 100 as shown in FIG. 1. In accordance with an embodiment, portable carrying apparatus 200 comprises a first arm portion 202, a body portion 204, and a second arm portion 206. First arm portion 202, a central body portion 204, and a second arm portion 206 may be configured as a frame structure and may be constructed from plastic, metal and the like. First arm portion 202 may comprise a first plurality of attachment protrusions 208a disposed on one or more lateral support members of the frame structure of first arm portion 202. First arm portion 202 may further comprise a handle portion 218 at one end of first arm portion 202 and a connector portion 210 at a second end of first arm portion 202. Second arm portion 206 may comprise a second plurality of attachment protrusions 208b disposed on one or more lateral support members of the frame structure of second arm portion 206. In accordance with certain embodiments, a user of portable carrying apparatus 200 may selectively attach a hook, carabiner, rope, or other attachment means to the first and second plurality of attachment protrusions 208a,b in order to selectively attach a cargo load to portable carrying apparatus 200. In accordance with various embodiments, a user may selectively attach a first cargo load to one or more attachment protrusions in the first plurality of attachment protrusions 208a and a second cargo load to one or more attachment protrusions in the second plurality of attachment protrusions 208b such that the first cargo load and the second cargo load are balanced along a center of gravity extending through a longitudinal axis of body portion 204. In accordance with certain aspects of the present disclosure, a user may position the cargo load(s) upwards, downwards, laterally or medially at one or more of attachment protrusions 208a,b in order to ensure a balanced center of gravity for the cargo loads when selectively attached to portable carrying apparatus 200. Second arm portion 206 may further comprise a second handle portion 222 at one end of second arm portion 206 and a connector portion 216 at a second end of second arm portion 206. In accordance with certain embodiments, body portion 204 may comprise a first arm attachment portion 212 and a second arm attachment portion 214. Body portion 204 may optionally comprise a handle portion 220. In accordance with certain embodiments, first arm attachment portion 212 of body portion 204 may be mateably coupled to connector portion 210 of first arm portion 202; and second arm attachment portion 214 of body portion 204 may be mateably coupled to connector portion 216 of second arm portion 206 (as shown in FIG. 5). As shown in FIG. 6, portable carrying apparatus 200 may be selectively deconstructed/disassembled by detaching first arm portion 202 and second arm portion 206 from body portion 204.

Figure 7:
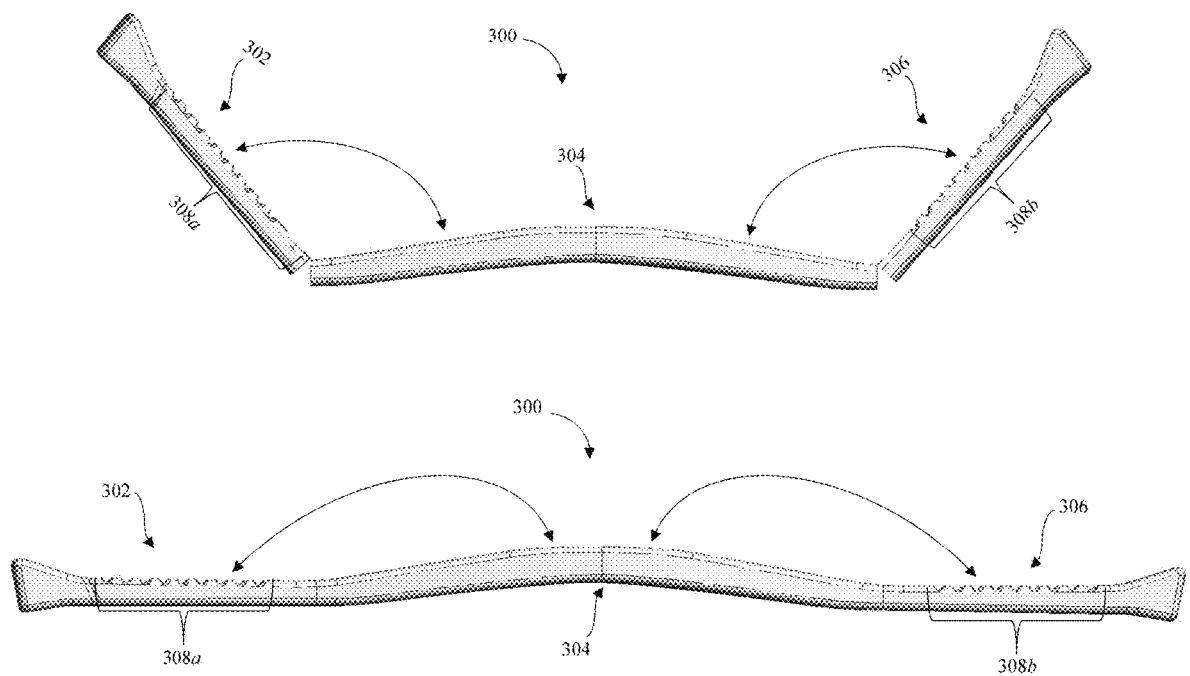
FIG. 7 is a functional perspective view of a portable carrying apparatus, in accordance with certain aspects of the present disclosure.

Referring now to FIG. 7, a functional perspective view of a portable carrying apparatus 300 is shown. In accordance with certain aspects of the present disclosure, portable carrying apparatus 300 may comprise an alternative embodiment of the present invention to those shown in FIGS. 1 and 2. In accordance with certain aspects of the present disclosure, portable carrying apparatus 300 may be comprised of a first arm portion 302, a body portion 304 and a second arm portion 306. In accordance with certain embodiments, first arm portion 302 may comprise a first plurality of concavities 308*a* disposed on an upper surface of first arm portion 302; and second arm portion 306 may comprise a second plurality of concavities 308*b* disposed on an upper surface of second arm portion 306. In accordance with certain aspects of the present disclosure, the plurality of concavities 308*a,b* may be configured as concavities 108*a,b*, as shown in FIG. 1. In accordance with certain embodiments, first arm portion 302 may be rotatably coupled to a first end of body portion 304 and second arm portion 306 may be rotatably coupled to a second end of body portion 304 such that first arm portion 302 and second arm portion 306 may be selectively rotated from a folded configuration (when not in use) to an extended configuration (when in use). In accordance with certain embodiments, first arm portion 302 and second arm portion 306 may rotate approximately 180 degrees such that first arm portion 302 and second arm portion 306 are selectively housed within a channel or aperture of body portion 304 when configured in the folded configuration.

Figure 8:
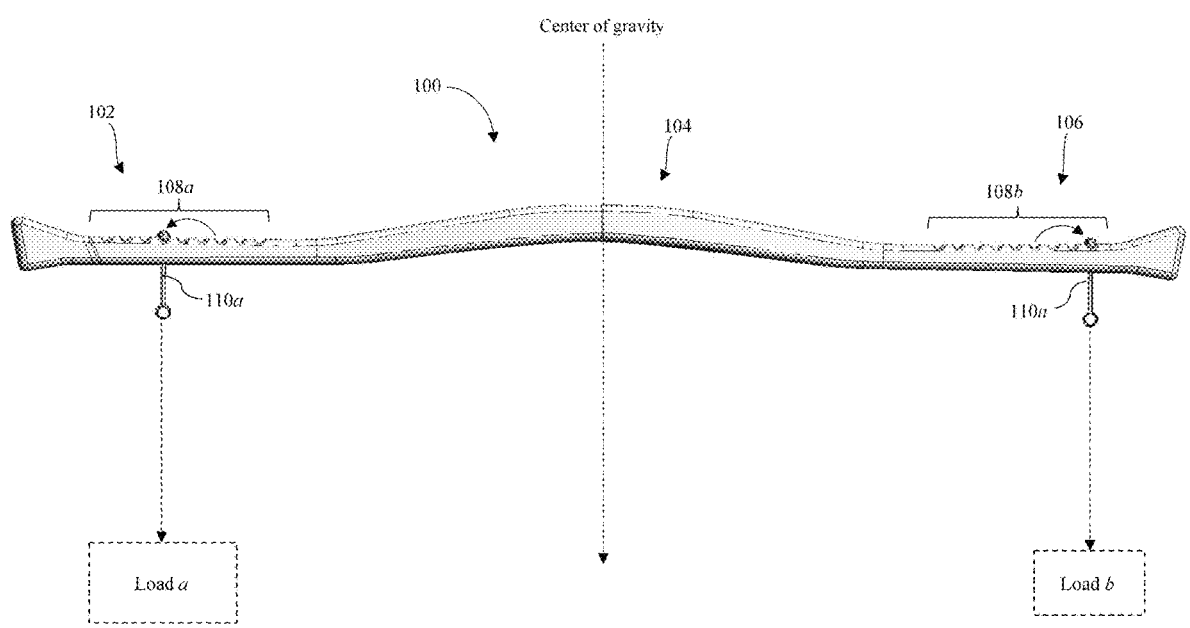
FIG. 8 is a functional perspective view of a portable carrying apparatus, in accordance with certain aspects of the present disclosure.

Referring now to FIG. 8, a functional perspective view of portable carrying apparatus 100 is shown. In accordance with certain aspects of the present disclosure, a user of portable carrying apparatus 100 may attach a first cargo Load a to a first attachment connector 110*a* and a second cargo Load b to a second attachment connector 110*n*. A user may selectively position first attachment connector 110*a* at a concavity along the first plurality of concavities 108*a* and may selectively position second attachment connector 110*n* at a concavity along the second plurality of concavities 108*b* such that a center of gravity for portable carrying apparatus 100 is substantially in the center of body portion 104 when portable carrying apparatus 100 is under load. A user may selectively move first attachment connector 110*a* and/or second attachment connector 110*n* to the left or right (i.e., laterally or medially) as necessary to better balance Load a and Load b when portable carrying apparatus 100 is worn by the user. In accordance with various aspects of the present disclosure, body portion 104 may be balanced on one or both shoulders of a user when portable carrying apparatus 100 is worn by the user.

Figure 9A:
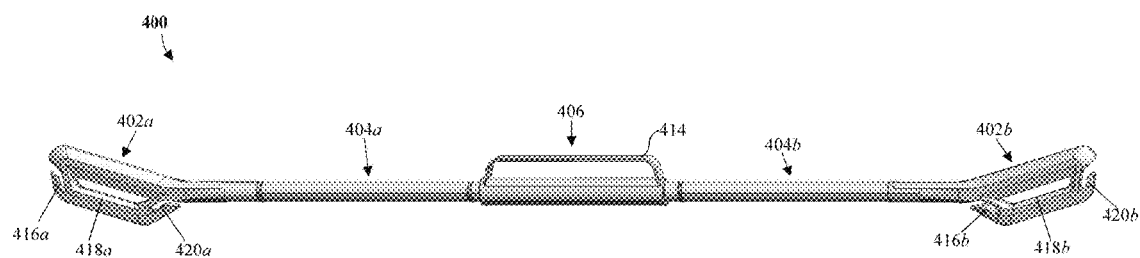
FIG. 9A is a perspective view of a portable carrying apparatus, in accordance with certain aspects of the present disclosure.
Figure 9B:
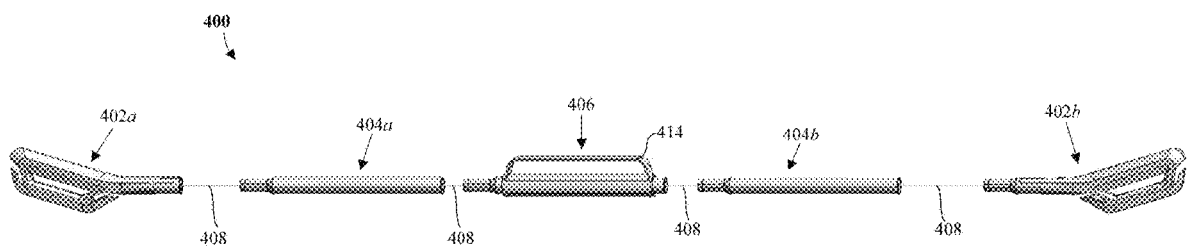
FIG. 9B is a perspective view of a portable carrying apparatus, in accordance with certain aspects of the present disclosure.

Referring now to FIGS. 9A-9B, perspective views of a portable carrying apparatus 400 are shown in a connected configuration (as shown in FIG. 9A) and a disconnected configuration (as shown in FIG. 9B). In accordance with certain aspects of the present disclosure, apparatus 400 comprises a plurality of segments that mateably couple together to form an elongated carrying apparatus. Each of the plurality of segments may be selectively de-coupled from each other to (e.g., as shown in FIG. 9B) enable a user to break down apparatus 400 and compact it for storage when not in use. In accordance with certain aspects of the present disclosure, apparatus 400 may have a first end (e.g., a proximal end) and a second end (e.g., a distal end) that are configured to receive/carry one or more cargo loads (e.g., a connected hook, strap, bag handle and the like). When the plurality of segments are mateably coupled together to form the elongated carrying apparatus (e.g., as shown in FIG. 9A), a user of apparatus 400 may selectively attach one or more cargo loads to the first end and/or second end of apparatus 400 and balance apparatus 400 on one or both of the user's shoulders to carry/transport the one or more cargo loads to and from a desired destination. Each of the plurality of segments may be constructed of metal or rigid plastic to provide apparatus 400 with the desired tensile strength for carrying the one or more cargo loads.

Still referring to FIGS. 9A-9B, in accordance with certain aspects of the present disclosure, apparatus 400 may comprise a first carrying segment 402*a*, a first arm segment 404*a*, a middle segment 406, a second arm segment 404*b*, and a second carrying segment 402*b*. In accordance with certain embodiments, first carrying segment 402*a* and second carrying segment 402*b* may comprise one or more curved and/or elongated members 416*a,b* and 420*a,b* configured to receive and retain one or more hooks, straps, bag handles, ropes and the like for carrying one or more cargo loads. In accordance with certain embodiments, first carrying segment 402*a* and second carrying segment 402*b* may further comprise one or more elongated aperture 418*a,b* configured to receive and retain one or more hooks, straps, bag handles, ropes and the like for carrying one or more cargo loads. In accordance with certain aspects of the present disclosure, each of first carrying segment 402*a*, first arm segment 404*a*, middle segment 406, second arm segment 404*b*, and second carrying segment 402*b* may be mateably interfaced/coupled together to comprise a connected configuration, as shown in FIG. 9A. In accordance with certain embodiments, middle segment 406 may comprise a handle 414 configured to enable a user to carry apparatus 400 by hand when in the connected configuration. In accordance with certain aspects of the present disclosure, apparatus 400 may further comprise a stretchable cord or cable 408 that extends through an interior channel or aperture of each of first carrying segment 402*a*, first arm segment 404*a*, middle segment 406, second arm segment 404*b*, and second carrying segment 402*b*. In accordance with certain embodiments, a first end of stretchable cord 408 is coupled/secured to an anchor point within the interior channel or aperture of first carrying segment 402*a*. A second end of stretchable cord 408 is threaded through the interior channel or aperture of each of first arm segment 404*a*, middle segment 406 and second arm segment 404*b*. The second end of stretchable cord 408 is coupled/secured to a second anchor point within the interior channel or aperture of second carrying segment 402*b*, such that first carrying segment 402*a*, first arm segment 404*a*, middle segment 406, second arm segment 404*b*, and second carrying segment 402b are retained (in that order) when apparatus 400 is configured in a disconnected configuration (as shown in FIG. 9B).

Figure 10:
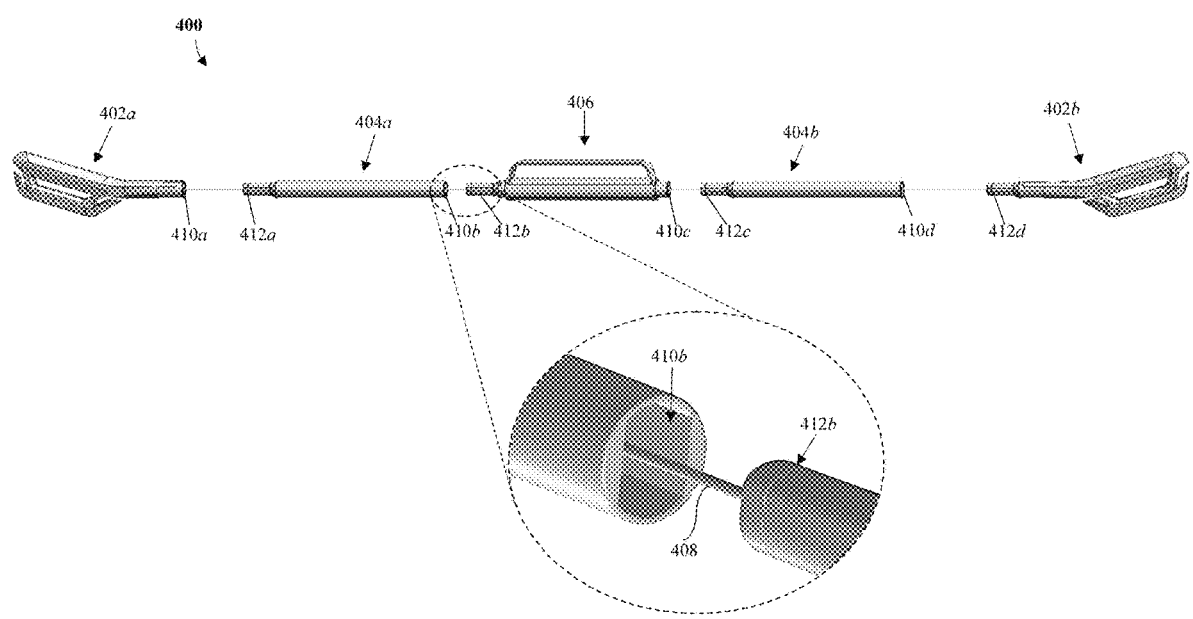
FIG. 10 is an enlarged view of a connector portion of the portable carrying apparatus, in accordance with certain aspects of the present disclosure.
Figure 11A:
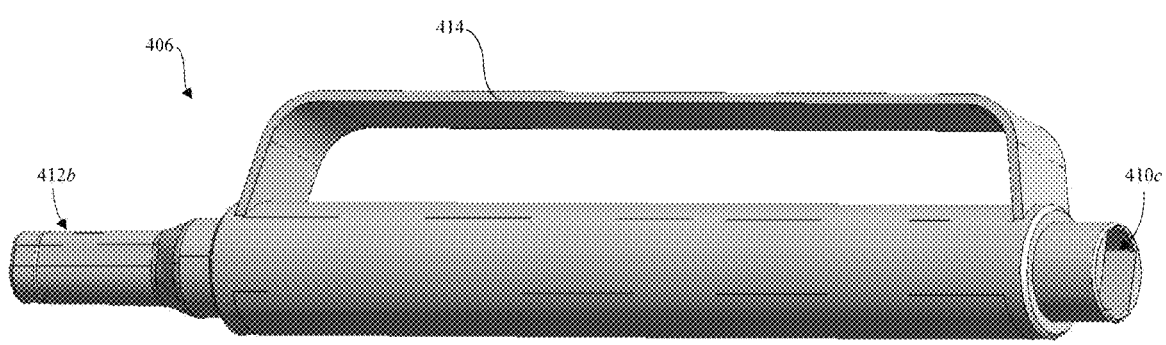
FIG. 11A is a perspective view of a component of the portable carrying apparatus, in accordance with certain aspects of the present disclosure.
Figure 11B:
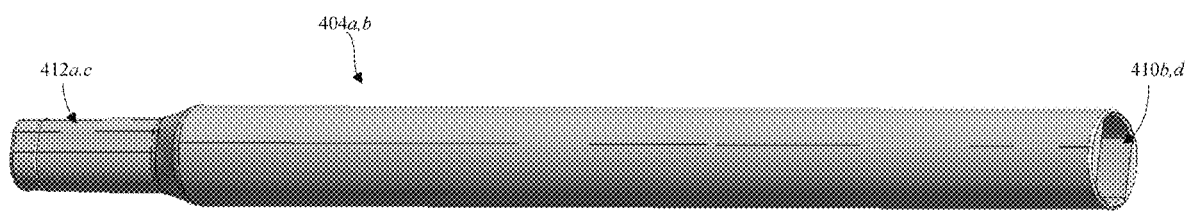
FIG. 11B is a perspective view of a component of the portable carrying apparatus, in accordance with certain aspects of the present disclosure.
Figure 11C:
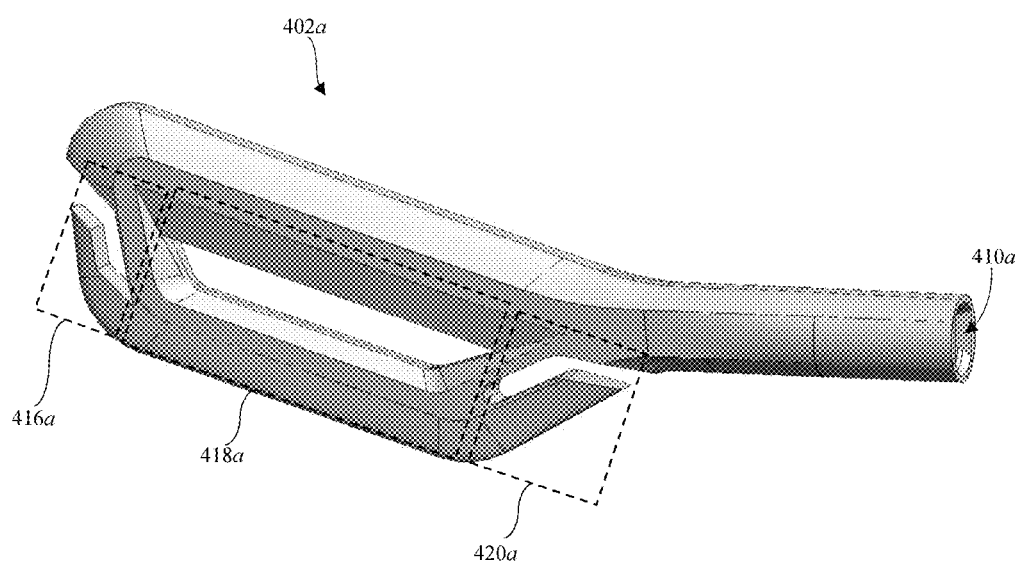
FIG. 11C is a perspective view of a component of the portable carrying apparatus, in accordance with certain aspects of the present disclosure.
Figure 11D:
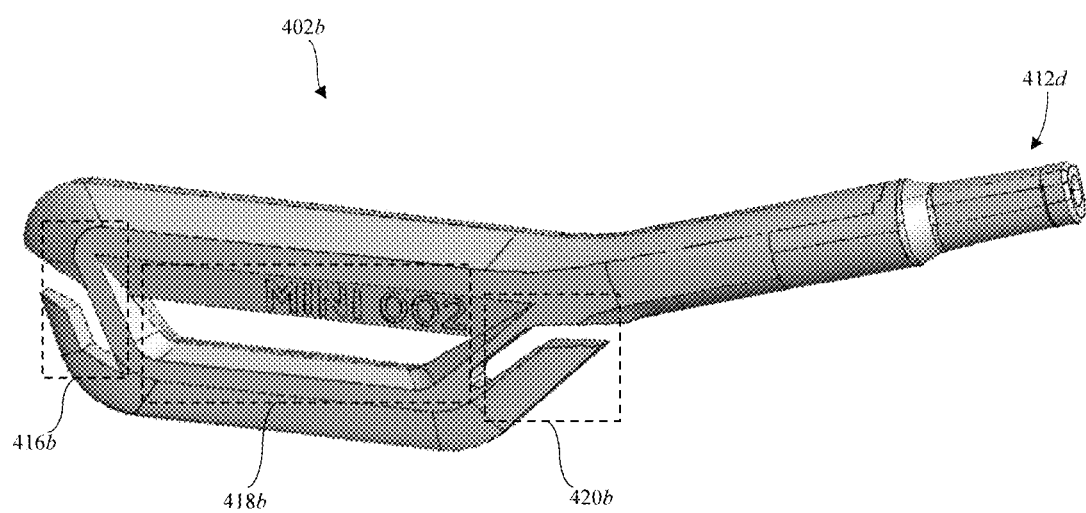
FIG. 11D is a perspective view of a component of the portable carrying apparatus, in accordance with certain aspects of the present disclosure.

Referring now to FIG. 10, a perspective view and an enlarged component view of apparatus 400 is shown. In accordance with certain aspects of the present disclosure, each of first carrying segment 402a, first arm segment 404a, middle segment 406, second arm segment 404b, and second carrying segment 402b may be mateably interfaced to comprise the connected configuration, as shown in FIG. 9A. In accordance with certain embodiments, each of first carrying segment 402a, first arm segment 404a, middle segment 406, second arm segment 404b, and second carrying segment 402b may comprise one or more structures for connecting with each neighboring segment. In certain embodiments, first carrying segment 402a may comprise a first connection aperture 410a configured to receive and retain a first connector protrusion 412a extending from an end of first arm segment 404a. First arm segment 404a may comprise a second connection aperture 410b configured to receive and retain a second connector protrusion 412b extending from an end of middle segment 406. Middle segment 406 may comprise a third connection aperture 410c configured to receive and retain a third connector protrusion 412c extending from an end of second arm segment 404b. Second arm segment 404b may comprise a fourth connection aperture 410d configured to receive and retain a fourth connector protrusion 412d extending from an end of second carrying segment 402b. In accordance with certain embodiments, each connection aperture 410a-d and connector protrusion 412a-d may comprise a keyed or mateable shape configured to retain each connected segment and prevent each connected segment from twisting/turning when apparatus 400 is configured in the connected configuration, as shown in FIG. 9A.

Referring now to FIGS. 11A-11D, component views to illustrate additional detail of each of first carrying segment 402a, first arm segment 404a, middle segment 406, second arm segment 404b, and second carrying segment 402b are shown. In accordance with certain embodiments, middle segment 406 may comprise an elongated structure comprising a handle portion 414 disposed at an upper surface thereof. Middle segment 406 may further comprise a connector protrusion 412b extending from a first end (i.e., proximal end) of the elongated structure and a connection aperture 410c disposed at a second end (i.e., distal end) of the elongated structure. In accordance with certain embodiments, each of arm segments 404a,b may comprise an elongated/tubular structure. Each of arm segments 404a,b may comprise a connector protrusion 412a,c extending from a first end (i.e., proximal end) of the elongated structure and a connection aperture 410b,d disposed at a second end (i.e., distal end) of the elongated structure. In accordance with certain embodiments, each of carrying segments 402a,b may comprise one or more curved and/or elongated members 416a,b and 420a,b configured to receive and retain one or more hooks, straps, bag handles, ropes and the like for carrying one or more cargo loads. In accordance with certain embodiments, each of carrying segments 402a,b may further comprise one or more elongated aperture 418a,b configured to receive and retain one or more hooks, straps, bag handles, ropes and the like for carrying one or more cargo loads.

Figure 12A:
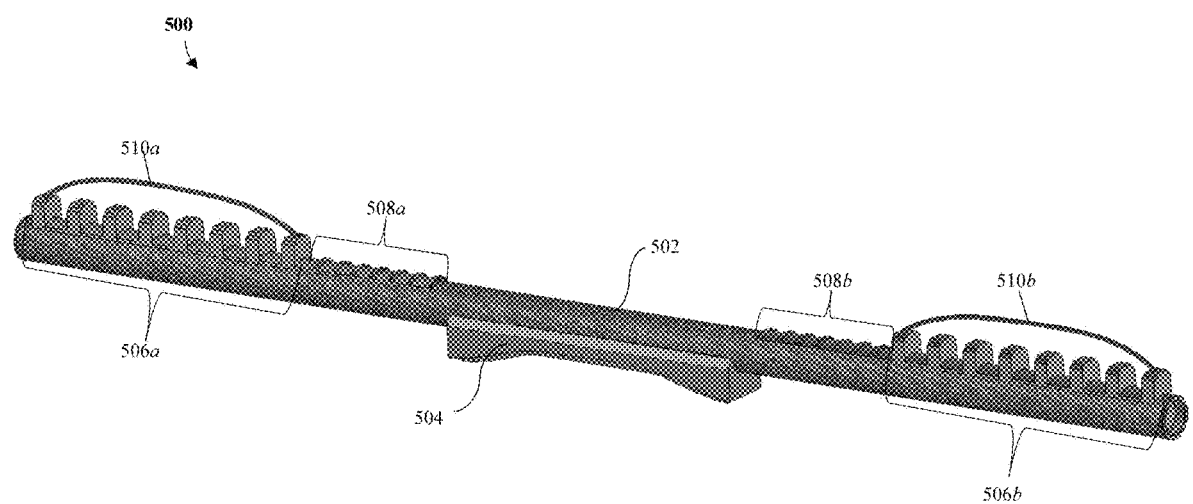
FIG. 12A is a perspective view of a portable carrying apparatus, in accordance with certain aspects of the present disclosure.
Figure 12B:
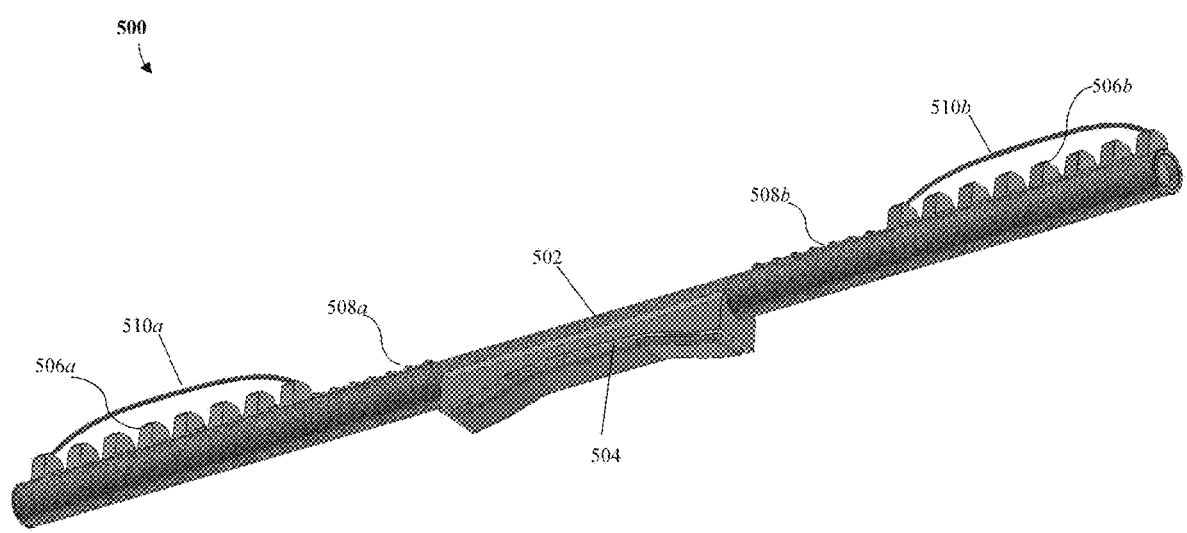
FIG. 12B is a perspective view of a portable carrying apparatus, in accordance with certain aspects of the present disclosure.

Referring now to FIGS. 12A-12B, a perspective view of a portable carrying apparatus 500 is shown. In accordance with certain aspects of the present disclosure, portable carrying apparatus 500 may comprise an elongated body member 502. Portable carrying apparatus 500 may further comprise a shoulder rest 504 coupled to a bottom surface of elongated body member 502. Shoulder rest 504 may be positioned at the middle of elongated body member 502 to enable a user to balance portable carrying apparatus 500 on the user's shoulder. Portable carrying apparatus 500 may further comprise a first plurality of connector protrusions 506a disposed on a left/proximal end of elongated body member 502 and a second plurality of connector protrusions 506b disposed on a right/distal end of elongated body member 502. First plurality of connector protrusions 506a and second plurality of connector protrusions 506b may be configured to receive and retain one or more hooks, straps, bag handles, ropes and the like for carrying one or more cargo loads. Portable carrying apparatus 500 may further comprise a first retaining strap 510a coupled to the first plurality of connector protrusions 506a and a second retaining strap 510b coupled to the second plurality of connector protrusions 506b. First retaining strap 510a and second retaining strap 510b may be configured to retain the one or more hooks, straps, bag handles, ropes and the like that are selectively positioned on the first plurality of connector protrusions 506a and the second plurality of connector protrusions 506b. Portable carrying apparatus 500 may further comprise a first grip portion 508a disposed on a left/proximal end of elongated body member 502 and a second grip portion 508b disposed on a right/distal end of elongated body member 502. First grip portion 508a and second grip portion 508b may comprise a textured/contoured/raised surface to improve the grip of a user on elongated body member 502 when the user is carrying a cargo load while balancing portable carrying apparatus 500 on the user's shoulder.

The terminology used herein is for describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. As used herein, "exemplary" means serving as an example or illustration and does not necessarily denote ideal or best.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A portable carrying apparatus comprising:
   a first carrying segment comprising a first load bearing portion and a first connector aperture disposed on an end of the first carrying segment,
   wherein the first load bearing portion comprises a first plurality of receiving portions,
   wherein the first load bearing portion comprises a first elongated aperture extending through the first load bearing portion adjacent to the first plurality of receiving portions;
   a middle segment comprising a first connector protrusion extending from a first end of the middle segment and a second connector aperture disposed on a second end of the middle segment; and
   a second carrying segment comprising a second load bearing portion and a second connector protrusion extending from an end of the second carrying segment,
   wherein the second load bearing portion comprises a second plurality of receiving portions,
   wherein the second load bearing portion comprises a second elongated aperture extending through the second load bearing portion adjacent to the second plurality of receiving portions,
   wherein the first connector protrusion extending from the first end of the middle segment is mateably interfaced with the first connector aperture disposed on the end of the first carrying segment,
   wherein the second connector protrusion extending from the end of the second carrying segment is mateably interfaced with the second connector aperture disposed on the second end of the middle segment.

2. The apparatus of claim 1 further comprising a stretchable cord extending through an interior portion of the first carrying segment, the middle segment and the second carrying segment.

3. The apparatus of claim 2 wherein the first carrying segment, the middle segment and the second carrying segment are configured to be selectively configured between a disconnected configuration and a connected configuration.

4. The apparatus of claim 3 wherein the stretchable cord is configured to retain the first carrying segment, the middle segment and the second carrying segment when selectively configured in the disconnected configuration.

5. The apparatus of claim 1 wherein the first connector aperture of the first carrying segment is configured to prevent the first carrying segment from twisting when the first connector protrusion of the middle segment is mateably interfaced with the first connector aperture of the first carrying segment.

6. The apparatus of claim 1 wherein the second connector aperture of the middle segment is configured to prevent the second carrying segment from twisting when the second connector protrusion of the second carrying segment is mateably interfaced with the second connector aperture of the middle segment.

7. The apparatus of claim 1 wherein the middle segment further comprises a handle portion.

8. A portable carrying apparatus comprising:
a first carrying segment comprising a first load bearing portion comprising a first plurality of receiving portions,
wherein the first load bearing portion comprises a first elongated aperture extending through the first load bearing portion adjacent to the first plurality of receiving portions;
a first arm segment mateably interfaced with the first carrying segment at a first end of the first arm segment;
a middle segment mateably interfaced with a second end of the first arm segment at a first end of the middle segment;
a second arm segment mateably interfaced with a second end of the middle segment at a first end of the second arm segment; and
a second carrying segment comprising a second load bearing portion comprising a second plurality of receiving portions,
wherein the second load bearing portion comprises a second elongated aperture extending through the second load bearing portion adjacent to the second plurality of receiving portions,
wherein the second carrying segment is mateably interfaced with a second end of the second arm segment at a first end of the second carrying segment.

9. The apparatus of claim 8 further comprising a stretchable cord extending through an interior portion of the first carrying segment, the first arm segment, the middle segment, the second arm segment, and the second carrying segment.

10. The apparatus of claim 9 wherein the first carrying segment, the first arm segment, the middle segment, the second arm segment, and the second carrying segment are configured to be selectively configured between a disconnected configuration and a connected configuration.

11. The apparatus of claim 10 wherein the stretchable cord is configured to retain the first carrying segment, the first arm segment, the middle segment, the second arm segment, and the second carrying segment when selectively configured in the disconnected configuration.

12. The apparatus of claim 8 wherein the first carrying segment further comprises at least one first channel configured to receive a first attachment.

13. The apparatus of claim 12 wherein the second carrying segment further comprises at least one second channel configured to receive a second attachment.

14. A portable carrying apparatus comprising:
a first carrying segment comprising a first load bearing portion comprising a first plurality of receiving portions,
wherein the first load bearing portion comprises a first elongated aperture extending through the first load bearing portion adjacent to the first plurality of receiving portions;
a first arm segment mateably interfaced with the first carrying segment at a first end of the first arm segment;
a middle segment mateably interfaced with a second end of the first arm segment at a first end of the middle segment;
a second arm segment mateably interfaced with a second end of the middle segment at a first end of the second arm segment;
a second carrying segment comprising a second load bearing portion comprising a second plurality of receiving portions,
wherein the second load bearing portion comprises a second elongated aperture extending through the second load bearing portion adjacent to the second plurality of receiving portions,
wherein the second carrying segment is mateably interfaced with a second end of the second arm segment at a first end of the second carrying segment; and
a stretchable cord extending through an interior portion of the first carrying segment, the first arm segment, the middle segment, the second arm segment, and the second carrying segment.

15. The apparatus of claim 14 wherein the first carrying segment, the first arm segment, the middle segment, the second arm segment, and the second carrying segment are configured to be selectively configured between a disconnected configuration and a connected configuration.

16. The apparatus of claim 15 wherein the stretchable cord is configured to retain the first carrying segment, the first arm segment, the middle segment, the second arm segment, and the second carrying segment when selectively configured in the disconnected configuration.

17. The apparatus of claim 15 wherein the first carrying segment, the first arm segment, the middle segment, the second arm segment, and the second carrying segment are rigidly coupled when configured in the connected configuration.

18. The apparatus of claim 14 wherein the middle segment further comprises a handle portion.

19. The apparatus of claim 14 wherein the first carrying segment further comprises at least one first channel configured to receive a first attachment.

20. The apparatus of claim 19 wherein the second carrying segment further comprises at least one second channel configured to receive a second attachment.

\* \* \* \* \*